United States Patent
Hirose et al.

(10) Patent No.: US 11,094,991 B2
(45) Date of Patent: Aug. 17, 2021

(54) BATTERY PACK FOR ELECTRIC VEHICLE

(71) Applicant: HONDA MOTOR CO., LTD., Tokyo (JP)

(72) Inventors: Eiki Hirose, Wako (JP); Yohei Azuma, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 197 days.

(21) Appl. No.: 16/579,839

(22) Filed: Sep. 24, 2019

(65) Prior Publication Data

US 2020/0119321 A1    Apr. 16, 2020

(30) Foreign Application Priority Data

Oct. 11, 2018    (JP) .............................. JP2018-192332

(51) Int. Cl.
*H01M 4/02* (2006.01)
*H01M 50/20* (2021.01)
(Continued)

(52) U.S. Cl.
CPC ............. *H01M 50/20* (2021.01); *B60L 50/64* (2019.02); *H01M 10/613* (2015.04);
(Continued)

(58) Field of Classification Search
CPC ....................................................... H01M 4/02
(Continued)

(56) References Cited

U.S. PATENT DOCUMENTS

2014/0023906 A1    1/2014  Hashimoto et al.
2014/0246259 A1    9/2014  Yamamura et al.
(Continued)

FOREIGN PATENT DOCUMENTS

DE    102019211899    3/2020
JP       5847815 B2    2/2012
(Continued)

OTHER PUBLICATIONS

Japanese Office Action for corresponding JP Application No. 2018-192332, dated May 20, 2020 (w/ English machine translation).
(Continued)

*Primary Examiner* — Jacob B Marks
(74) *Attorney, Agent, or Firm* — Mori & Ward, LLP (57) ABSTRACT

In a battery pack for an electric vehicle, by fixing a lid member to plural fixing portions provided on a bottom wall of a battery case, a cooling medium jacket is formed between a lower face of the bottom wall and an upper face of the lid member. Thickness of the battery case in the fixing portion is formed larger than thickness thereof around the fixing portion. The fixing portion includes a bulge portion bulging upward toward a lower face of a battery module. The lower face thereof includes a recess portion recessed upward, and a projecting portion projecting downward. Since the bulge portion is disposed at a position opposing the recess portion. Accordingly, it is possible to form the cooling medium jacket by strongly fixing the lid member to the lower face of the bottom wall while avoiding increase in the vertical dimension of the battery pack.

7 Claims, 6 Drawing Sheets

(51) Int. Cl.
    *H01M 10/613* (2014.01)
    *H01M 10/625* (2014.01)
    *H01M 10/655* (2014.01)
    *B60L 50/64* (2019.01)
    *B60K 1/04* (2019.01)
    *B60K 1/00* (2006.01)
    *B60K 6/28* (2007.10)

(52) U.S. Cl.
    CPC ....... *H01M 10/625* (2015.04); *H01M 10/655* (2015.04); *B60K 1/04* (2013.01); *B60K 6/28* (2013.01); *B60K 2001/005* (2013.01); *B60K 2001/0438* (2013.01); *B60Y 2200/91* (2013.01); *B60Y 2200/92* (2013.01); *B60Y 2306/05* (2013.01); *B60Y 2400/112* (2013.01); *H01M 2220/20* (2013.01)

(58) Field of Classification Search
    USPC .......................................... 429/122
    See application file for complete search history.

(56) References Cited

U.S. PATENT DOCUMENTS

| | | |
|---|---|---|
| 2015/0236314 A1 | 8/2015 | Lee et al. |
| 2017/0194676 A1 | 7/2017 | Omura |
| 2018/0337375 A1* | 11/2018 | Kellner ............. H01M 10/6567 |
| 2019/0006643 A1 | 1/2019 | Sakurai |
| 2020/0075907 A1 | 3/2020 | Shimazaki et al. |

FOREIGN PATENT DOCUMENTS

| | | |
|---|---|---|
| JP | WO2012/133708 | 10/2012 |
| JP | 2013-082312 | 5/2013 |
| JP | 2014-157756 | 8/2014 |
| JP | WO2016/002178 | 1/2016 |
| JP | 2019-009084 | 1/2019 |
| WO | WO 2019/230325 | 12/2019 |

OTHER PUBLICATIONS

German Search report for corresponding DE Application No. 102019214920.0, dated Jun. 12, 2020.

\* cited by examiner

BATTERY PACK FOR ELECTRIC VEHICLE

BACKGROUND OF THE INVENTION

Field of the Invention

The present invention relates to a battery pack for an electric vehicle in which by fixing a lid member to a plurality of fixing portions provided on a bottom wall of a battery case housing a battery module having a plurality of battery cells, a cooling medium jacket for cooling the battery module is formed between a lower face of the bottom wall of the battery case and an upper face of the lid member, at least part of the plurality of fixing portions being disposed on an outer side of the cooling medium jacket.

Description of the Related Art

Japanese Patent No. 5847815 has made known a cooling device for a vehicle battery in which a plate-shaped coolant line (cooling medium jacket) having a plurality of coolant flow paths formed in its interior is abutted against the bottom of the battery, and this coolant line is fixed to the bottom of the battery by a clamp element with a heat insulating element held therebetween.

If a plate-shaped lid member is fixed from below by a bolt to a fixing portion provided on a bottom wall of a battery case, and a cooling medium jacket for cooling the battery is formed between a lower face of the bottom wall of the battery case and an upper face of the lid member, it is possible to minimize the number of components of the cooling medium jacket and to reduce the vertical dimension of a battery pack.

In this case, in order to prevent cooling medium from leaking from the cooling medium jacket, if an attempt is made to strongly fix the lid member to the bottom wall of the battery case, it is inevitable that the length of the bolt will increase and the fixing portion of the battery case will become large, and this gives rise to the problem that the reduction in the vertical dimension of the battery pack is inhibited.

SUMMARY OF THE INVENTION

The present invention has been accomplished in light of the above circumstances, and it is an object thereof to form a cooling medium jacket by strongly fixing a lid member to a lower face of a bottom wall of a battery case while avoiding any increase in the vertical dimension of a battery pack.

In order to achieve the object, according to a first aspect of the present invention, there is provided a battery pack for an electric vehicle in which by fixing a lid member to a plurality of fixing portions provided on a bottom wall of a battery case housing a battery module having a plurality of battery cells, a cooling medium jacket for cooling the battery module is formed between a lower face of the bottom wall of the battery case and an upper face of the lid member, at least part of the plurality of fixing portions being disposed on an outer side of the cooling medium jacket, wherein a thickness of the battery case in each of the fixing portions is formed so as to be larger than a thickness of the battery case around each of the fixing portions, the fixing portion comprises a bulge portion that bulges upward toward a lower face of the battery module, the lower face of the battery module comprises a recess portion that is recessed upward and a projecting portion that projects downward, and the bulge portion is disposed at a position opposing the recess portion.

In accordance with the first aspect, with regard to the battery pack for an electric vehicle, by fixing the lid member to the plurality of fixing portions provided on the bottom wall of the battery case housing the battery module having the plurality of battery cells, the cooling medium jacket for cooling the battery module is formed between the lower face of the bottom wall of the battery case and the upper face of the lid member. At least part of the plurality of fixing portions are disposed on the outer side of the cooling medium jacket, the thickness of the battery case in the fixing portion is formed so as to be larger than the thickness of the battery case around the fixing portion, the fixing portion includes the bulge portion, which bulges upward toward the lower face of the battery module, and the lower face of the battery module includes the recess portion, which is recessed upward, and the projecting portion, which projects downward; since the bulge portion is disposed at a position opposing the recess portion, it is possible to prevent any increase in the vertical dimension of the battery pack due to the bulge portion being provided while being able to increase the thickness of the fixing portion by a portion corresponding to the bulge portion so as to enhance the strength with which the lid member is fixed.

According to a second aspect of the present invention, in addition to the first aspect, a heat transfer member is disposed outside of the cooling medium jacket at a position away from the bulge portion, the heat transfer member being sandwiched between an upper face of the bottom wall of the battery case and the lower face of the battery module, and a height of an upper end of the heat transfer member is larger than a height of an upper end of the bulge portion.

In accordance with the second aspect, since the heat transfer member is disposed outside of the cooling medium jacket at a position away from the bulge portion, the heat transfer member being sandwiched between the upper face of the bottom wall of the battery case and the lower face of the battery module, and the height of the upper end of the heat transfer member is larger than the height of the upper end of the bulge portion, the cooling performance can be enhanced by efficiently allowing the heat of the battery module to escape to the battery case by the heat transfer member, and the bulge portion can be prevented from interfering with the bottom face of the battery module.

According to a third aspect of the present invention, in addition to the first aspect, the battery module comprises a plate-shaped member, made of a metal, that forms the lower face of the battery module, the plate-shaped member has a thin portion in a portion opposing the cooling medium jacket, the thin portion having a smaller thickness than that of other portions, and at least part of the bulge portion is positioned beneath the thin portion.

In accordance with the third aspect, since the battery module includes the plate-shaped member, which is made of a metal and forms the lower face thereof, the plate-shaped member having, in a portion opposing the cooling medium jacket, a thin portion having a smaller thickness than that of other portions, and at least part of the bulge portion is positioned beneath the thin portion, the bulge portion can be housed in the thin portion, which is the recess portion of the plate member, thus reducing the height of the battery pack.

According to a fourth aspect of the present invention, in addition to the third aspect, the battery module comprises a pair of side plates that fasten the plurality of battery cells together as a unit, the side plates each having a main body portion that covers side faces of the plurality of battery cells and an extended portion that is formed by bending a lower end of the main body portion and is superimposed on the lower face of the plate-shaped member, and the bulge portion is disposed at a position without interference with the extended portion.

In accordance with the fourth aspect, the battery module includes the pair of side plates, which fasten the plurality of battery cells together as a unit, and the side plate has the main body portion, which covers side faces of the plurality of battery cells, and the extended portion, which is formed by bending the lower end of the main body portion and is superimposed on the lower face of the plate-shaped member; since the bulge portion is disposed at a position where it does not interfere with the extended portion, even if the bending angle of the extended portion of the side plate opens out, the extended portion is prevented from interfering with the bulge portion.

According to a fifth aspect of the present invention, in addition to the fourth aspect, the plate-shaped member is formed such that a plate thickness of opposite side portions along the pair of side plates is large and a plate thickness of a middle portion sandwiched between the pair of opposite side portions is small, and the extended portion of the side plate is superimposed on at least part of the opposite side portions of the plate-shaped member.

In accordance with the fifth aspect, since the plate-shaped member is formed such that the plate thickness of the opposite side portions along the pair of side plates is large and the plate thickness of the middle portion sandwiched between the pair of opposite side portions is small, and the extended portion of the side plate is superimposed on at least part of the opposite side portions of the plate-shaped member, it is possible to strongly support the extended portion of the side plate by the opposite side portions of the plate-shaped member, which have a large plate thickness, thereby enhancing the rigidity of the battery module.

According to a sixth aspect of the present invention, in addition to the first aspect, a bolt hole is formed so as to extend upward from a lower face of the fixing portion, and the lid member is fixed to the battery case by a bolt screwed into the bolt hole.

In accordance with the sixth aspect, since the bolt hole is formed so as to extend upward from the lower face of the fixing portion and the lid member is fixed to the battery case by the bolt screwed into the bolt hole, it is possible to simply and strongly fix the lid member to the battery case.

According to a seventh aspect of the present invention, in addition to the first aspect, the battery case is made by metal die-casting, and the fixing portion is formed integrally with the battery case.

In accordance with the seventh aspect, since the battery case is made by metal die-casting, and the fixing portion is formed integrally with the battery case, it is possible to easily form the fixing portion with a desired shape without increasing the number of components.

Note that a case main body 31 of an embodiment corresponds to the battery case of the present invention, a lower plate 36 of the embodiment corresponds to the plate-shaped member of the present invention, a middle portion 36c of the embodiment corresponds to the thin portion of the present invention, and a water jacket 45 of the embodiment corresponds to the cooling medium jacket of the present invention.

The above and other objects, characteristics and advantages of the present invention will be clear from detailed descriptions of the preferred embodiment which will be provided below while referring to the attached drawings.

DESCRIPTION OF THE PREFERRED EMBODIMENT

An embodiment of the present invention is explained below by reference to FIG. 1 to FIG. 6. In the following description reference numbers corresponding to components of exemplary embodiment are included only for ease of understanding, but the applicant's claims are not limited to the exemplary embodiment or to specific components of the exemplary embodiment. In the present specification, the fore-and-aft direction, the left-and-right direction (vehicle width direction), and the up-and-down direction are defined with reference to an occupant seated on a driving seat.

Figure 1:
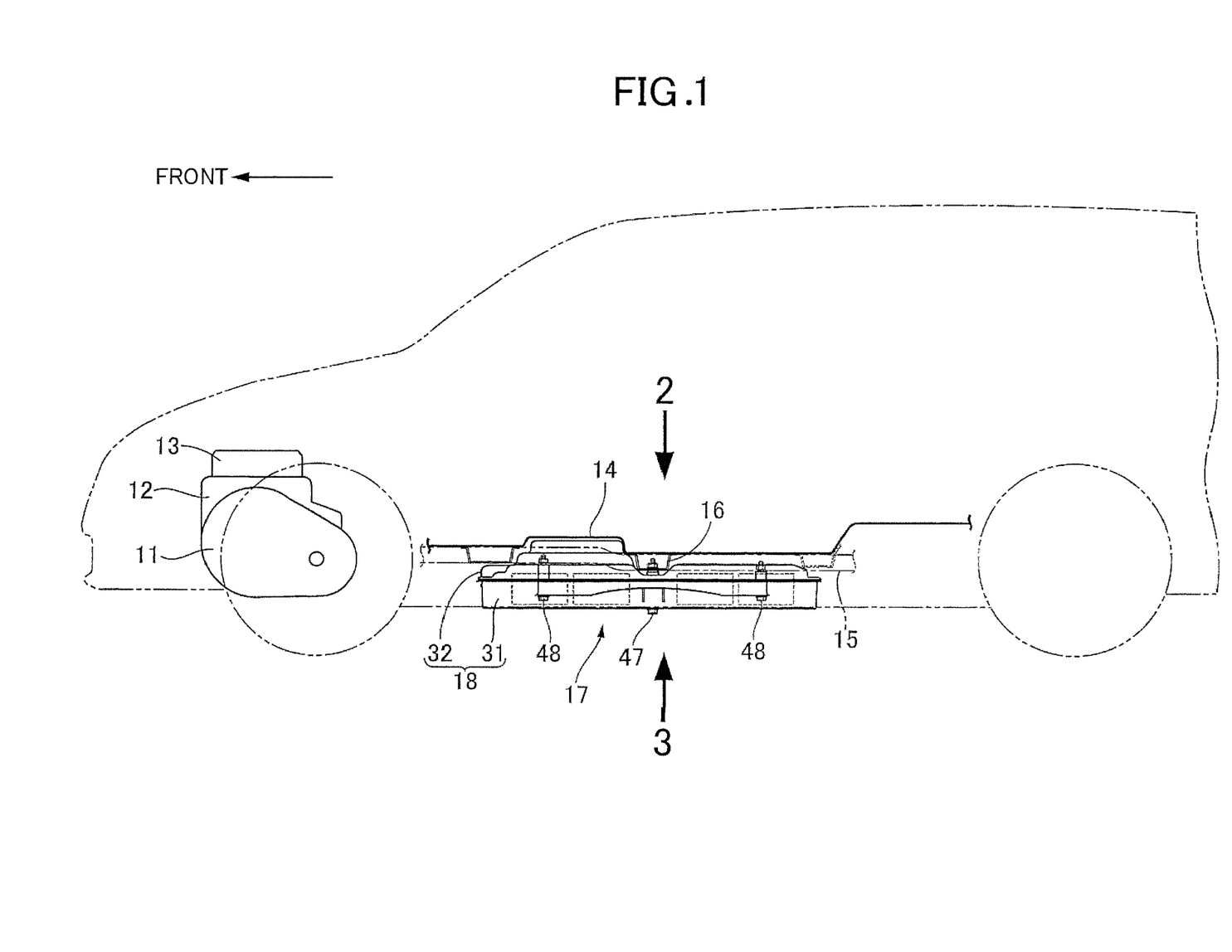
FIG. 1 is a side view of a vehicle body of a plug-in hybrid vehicle.
Figure 2:
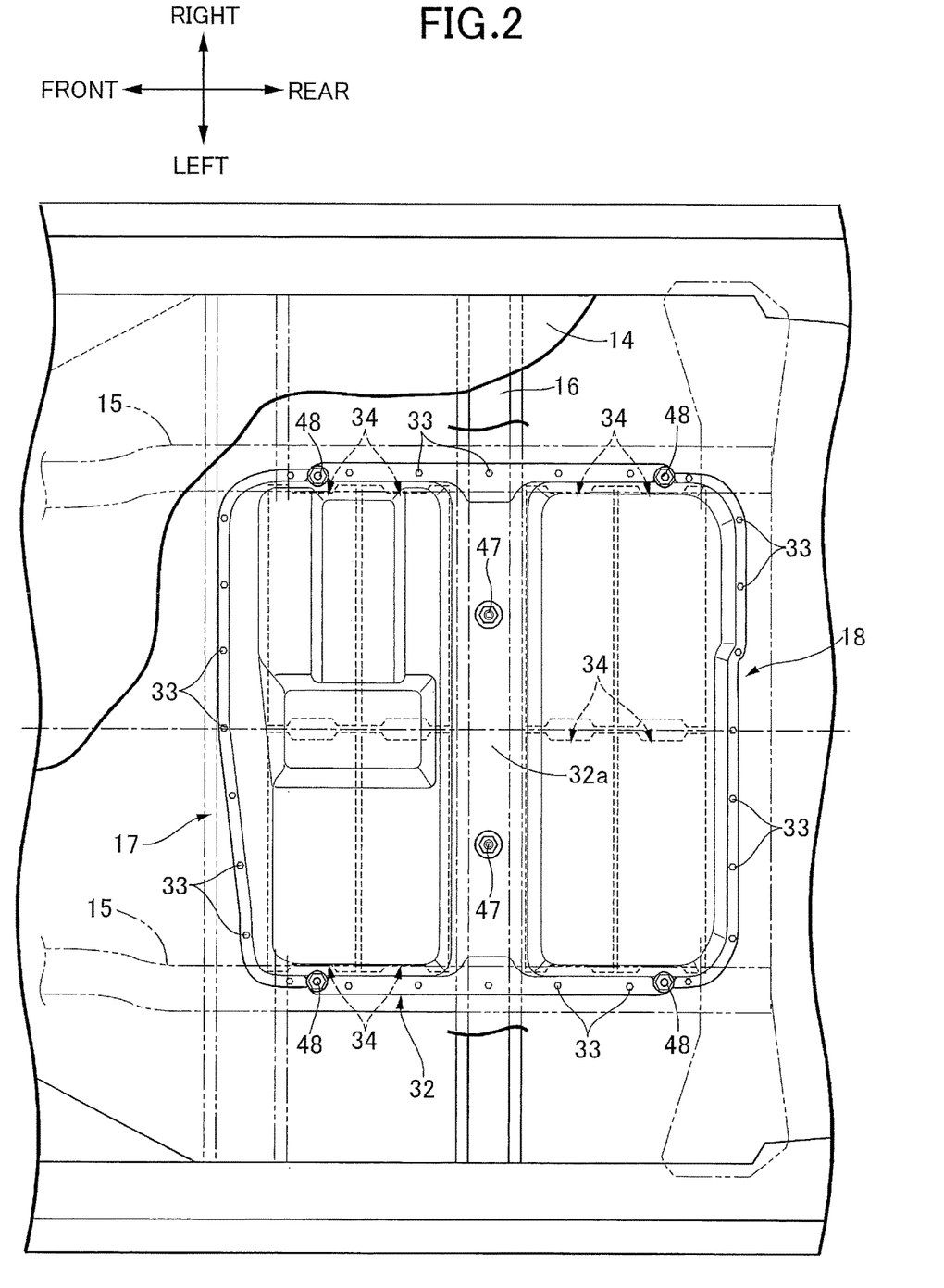
FIG. 2 is a view in the direction of arrow 2 in FIG. 1.

As shown in FIG. 1 and FIG. 2, mounted on a front part of a vehicle body of a front wheel drive plug-in hybrid vehicle are an electric motor 11 for driving a front wheel, an engine 12 for driving a generator charging a battery, and a power drive unit 13 equipped with an inverter for controlling the driving of the electric motor 11. Disposed on a lower face of a floor panel 14 are a pair of left and right floor frames 15 extending in the fore-and-aft direction and a floor cross member 16 connecting the left and right floor frames 15 in the vehicle width direction, and fixed to lower faces of the floor frame 15 and the floor cross member 16 is a battery case 18 forming the outer shell of a battery pack 17 for supplying power to the electric motor 11.

Figure 6:
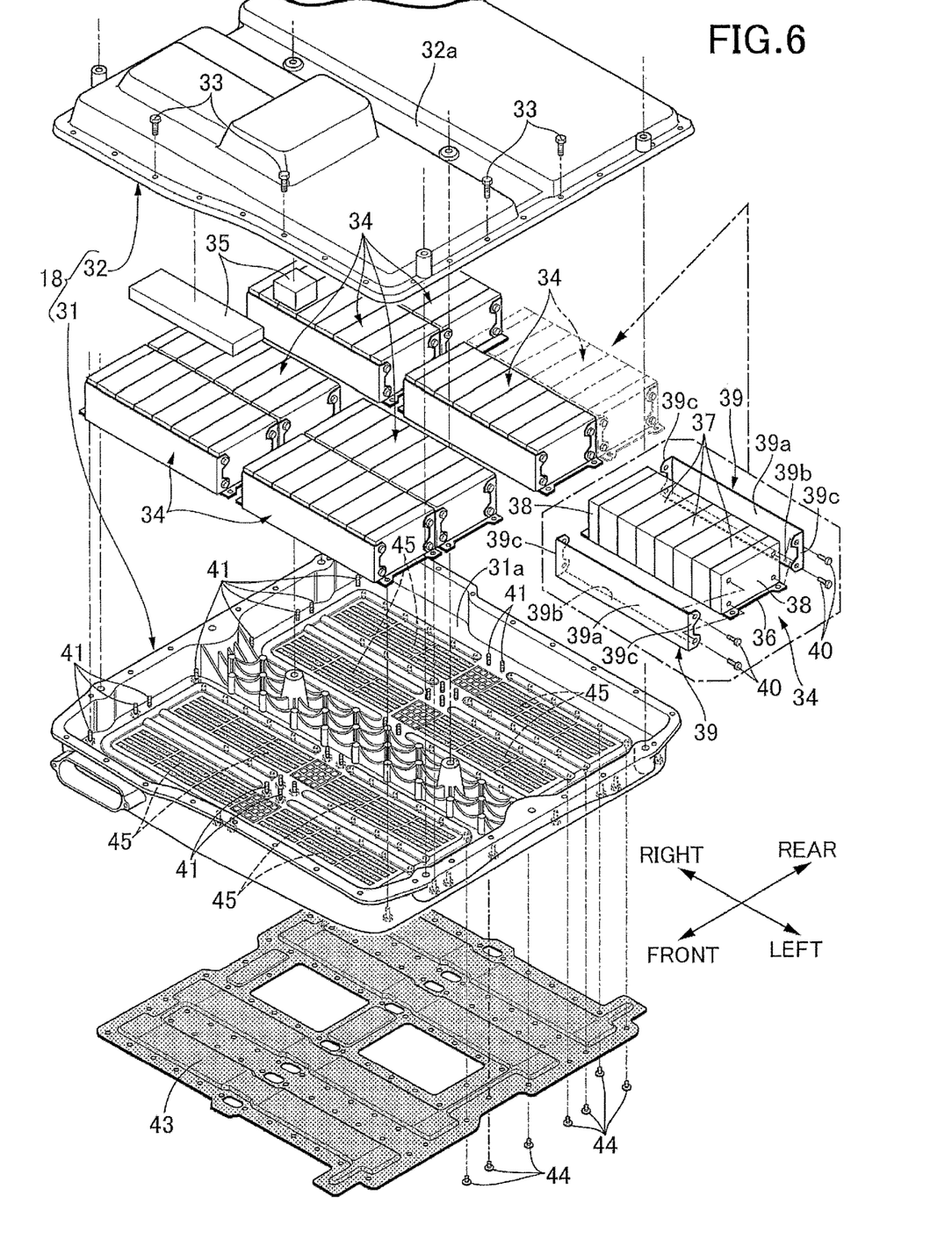
FIG. 6 is an exploded perspective view of a battery pack.

As shown in FIG. 6, the battery case 18 is formed by joining in the up-down direction a case main body 31 made by metal (aluminum) die-casting and opening upward and a cover 32 made by metal (aluminum) die-casting and opening downward via outer peripheral parts thereof by a plurality of bolts 33. Eight battery modules 34 are mounted on a bottom part of the case main body 31, and an electrical component 35 such as a battery control device, a junction board, or a cell voltage sensor is disposed above the battery modules 34.

The battery module 34 includes a lower plate 36 that is formed from a rectangular metal plate, a plurality of battery cells 37 that are placed on an upper face of the lower plate 36 in a stacked state, a pair of end plates 38 that are superimposed on opposite ends in the stacking direction of the plurality of battery cells 37, and a pair of side plates 39 that are formed from a metal plate that abuts against opposite side faces of the plurality of battery cells 37 and the pair of end plates 38.

The side plate 39 includes a rectangular main body portion 39a, an extended portion 39b that is bent at right angles from the lower edge of the main body portion 39a and abuts against lower faces of the plurality of battery cells 37 and the pair of end plates 38, and a pair of flange portions 39c that are bent at right angles from opposite end parts in the longitudinal direction of the main body portion 39a and abut against outer faces of the pair of end plates 38. Fastening the flange portion 39c to the outer face of the end plate 38 by a bolt 40 assembles the battery module 34.

Figure 3:
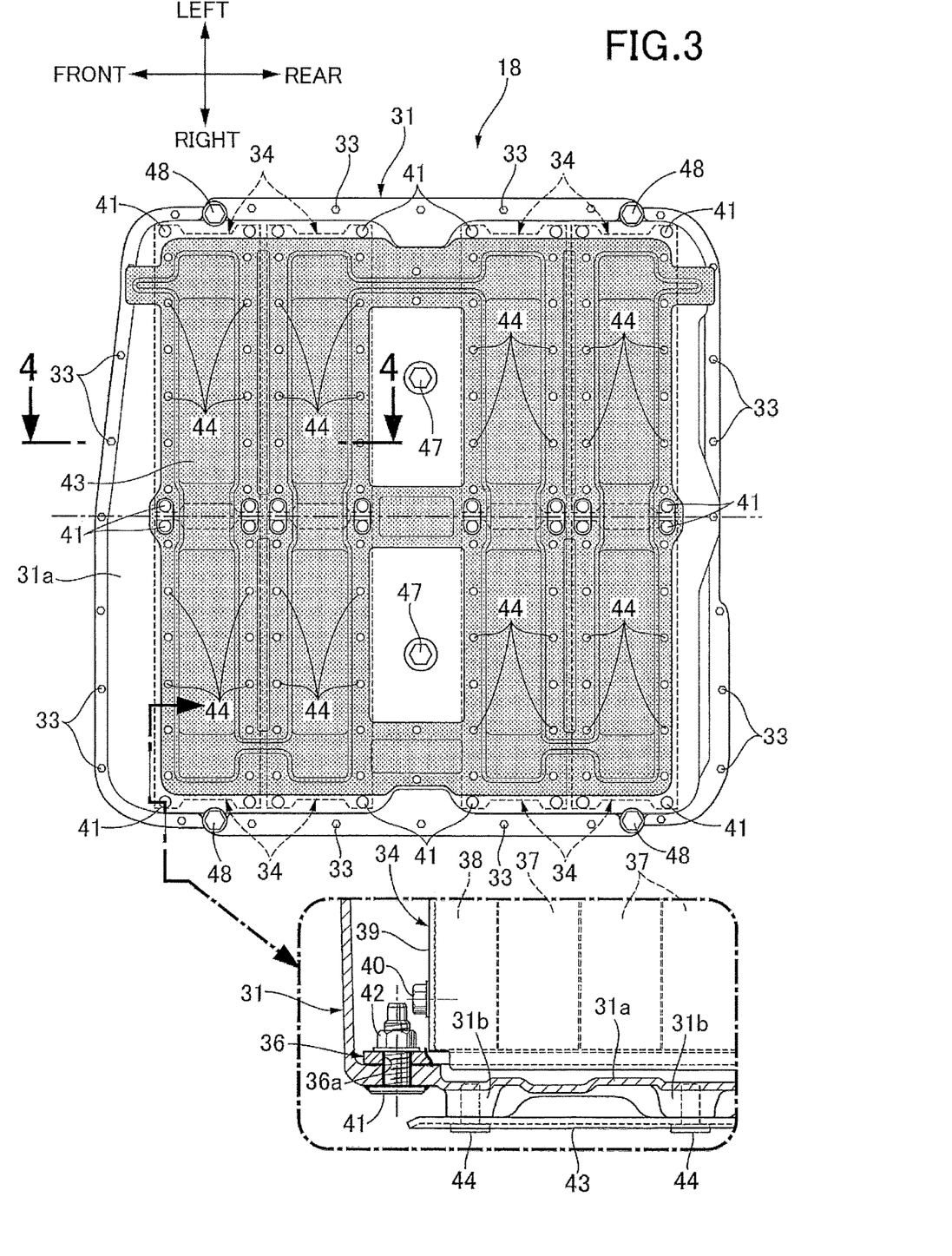
FIG. 3 is a view in the direction of arrow 3 in FIG. 1.

As shown in FIG. 3, bolt holes 36a are formed in four corners of the lower plate 36 of each battery module 34, and inserting through the bolt holes 36a four stud bolts 41 upwardly fixed to a bottom wall 31a of the case main body 31 and fastening by nuts 42 fixes the battery module 34 to an upper face of the bottom wall 31a of the case main body 31.

Figure 4:
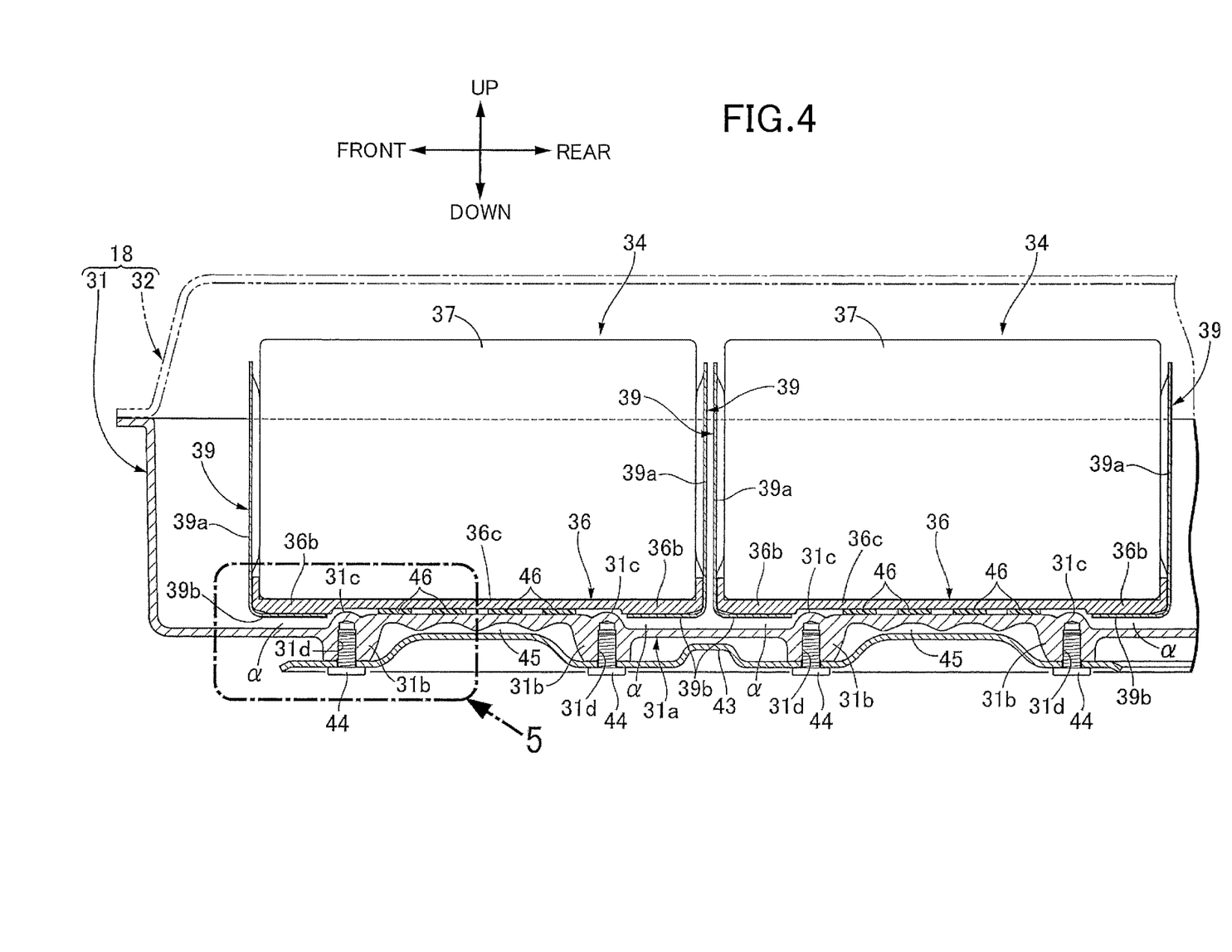
FIG. 4 is a sectional view along line 4-4 in FIG. 3.
Figure 5:
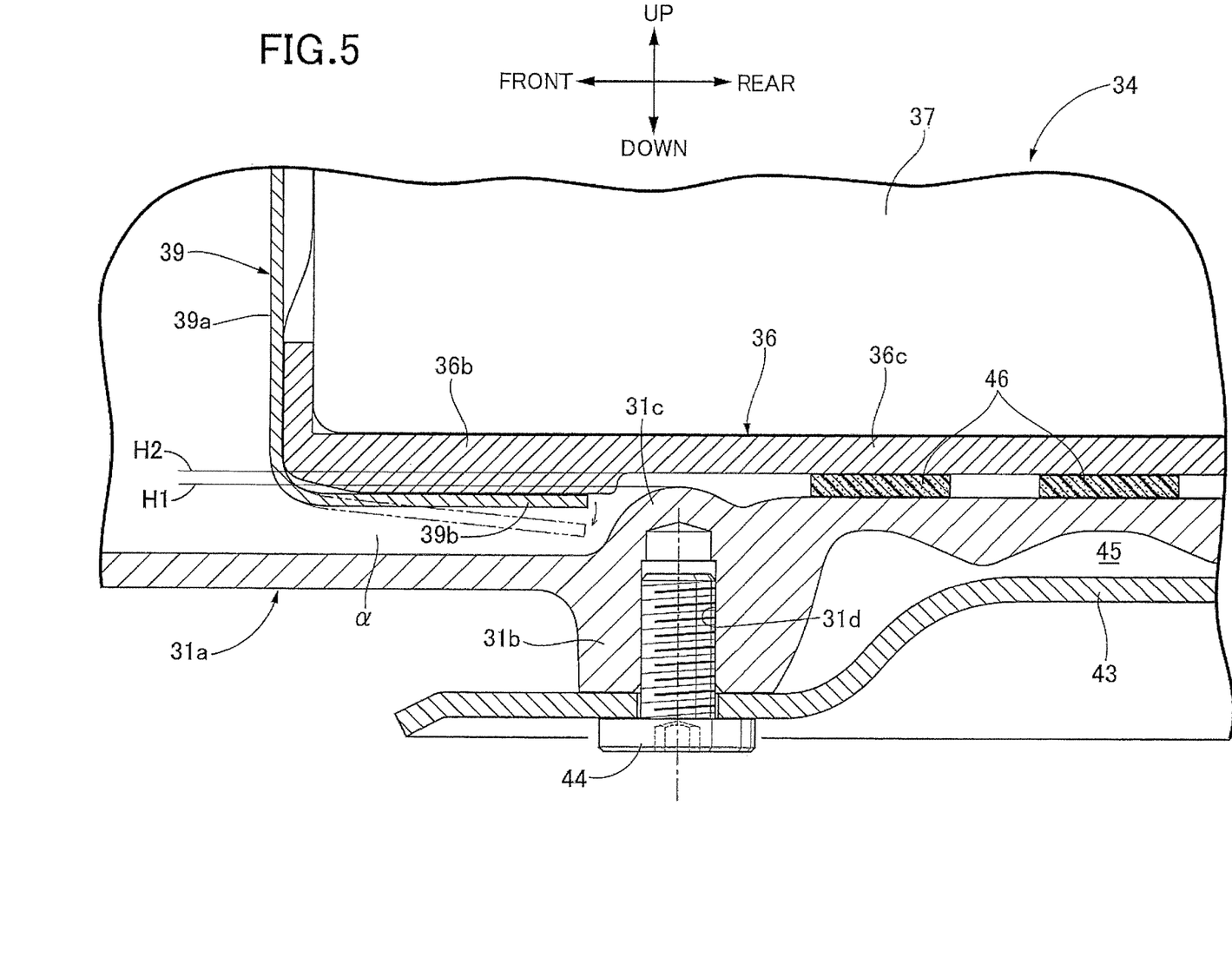
FIG. 5 is an enlarged view of part 5 in FIG. 4.

As shown in FIG. 3 to FIG. 5, the lower plate 36 of the battery module 34 includes thick opposite side portions 36b against which the extended portion 39b of the side plate 39 abuts, and a thin middle portion 36c that is sandwiched between the pair of opposite side portions 36b extending in parallel with each other, and a lower face of the middle portion 36c is recessed upward relative to lower faces of the opposite side portions 36b. The lower faces of the opposite side portions 36b of the lower plate 36 therefore form a projecting portion projecting downward, and the lower face of the middle portion 36c of the lower plate 36 forms a recess portion recessed upward.

A lid member 43 formed from one metal plate is fastened to a lower face of the bottom wall 31a of the case main body 31 of the battery case 18 by a plurality of bolts 44, and a water jacket 45 is formed between an upper face of the lid member 43 and the lower face of the bottom wall 31a of the case main body 31, cooling water flowing through the water jacket 45. Eight water jackets 45 are formed so as to correspond to the eight battery modules 34 and are connected in series (see FIG. 6).

A plurality of fixing portions 31b are formed on the bottom wall 31a of the case main body 31 so as to encircle the area around the water jacket 45, the bolts 44 for fixing the lid member 43 being screwed into the fixing portions 31b. The fixing portion 31b of the bottom wall 31a of the case main body 31 is formed so as to be thicker than other portions of the bottom wall 31a, and a bulge portion 31c bulges upward from the upper end of the fixing portion 31b toward the lower face of the upwardly recessed middle portion 36c of the lower plate 36 of the battery module 34. A bolt hole 31d as a female thread for the bolt 44 to be screwed into opens on the lower face of the fixing portion 31b.

The upper face of the bottom wall 31a, which is positioned on the outer side of the water jacket 45, of the case main body 31 has a predetermined gap a between itself and a lower face of the extended portion 39b, which is positioned thereabove, of the side plate 39 of the battery module 34. Furthermore, the extremity of the extended portion 39b of the side plate 39 is positioned further outside than the bulge portion 31c of the bottom wall 31a of the case main body 31 so as not to interfere with the bulge portion 31c.

A sheet-form, gel-form, or paste-form heat transfer member 46 is disposed outside of the water jacket 45, an upper face of the heat transfer member 46 abutting against the lower face of the lower plate 36 of the battery module 34, and a lower face thereof abutting against the upper face of the bottom wall 31a of the case main body 31. A height H2 of the upper end of the heat transfer member 46 is larger than the height H1 of the upper end of the bulge portion 31c (see FIG. 5).

As shown in FIG. 1 and FIG. 2, the battery case 18 of the battery pack 17 thus formed is fastened to the lower face of the floor cross member 16 by two bolts 47 extending from bottom to top through a middle part thereof in a state in which a recess portion 32a formed in the cover 32 and extending in the vehicle width direction is fitted onto the floor cross member 16 from below, and is fastened to the lower face of the floor frame 15 by two bolts 48 extending from bottom to top through each of left and right side parts thereof.

The operation of the embodiment of the present invention having the above arrangement is now explained.

When heat is generated by the battery cell 37 of the battery module 34 accompanying charging or discharging, part of the heat is transferred directly to the lower plate 36, which is in contact with the bottom face of the battery cell 37, another part thereof is transferred to the lower plate 36 via the side plate 39, which is in contact with the side face of the battery cell 37, and the temperature of the lower plate 36 is thus increased. The heat of the lower plate 36 is transferred to the bottom wall 31a of the case main body 31 via the heat transfer member 46, which abuts against the lower face of the lower plate 36, and is also transferred to the lid member 43 fixed to the bottom wall 31a of the case main body 31; the bottom wall 31a of the case main body 31 and the lid member 43, whose temperatures have risen, are cooled by the cooling water flowing through the interior of the water jacket 45, which is formed therebetween, and the battery module 34 is thereby cooled, thus preventing deterioration of the battery cell 37.

The bolts 44 for fastening the lid member 43 to the bottom wall 31a of the case main body 31 are disposed so as to surround the area around the water jacket 45, and leakage of cooling water from the water jacket 45 is prevented by the tightening force of the bolts 44. In order for the bolt 44 to exhibit a sufficient tightening force, it is necessary for the bolt 44 to have a sufficient length; since the fixing portion 31b having formed therein the bolt hole 31d, into which the bolt 44 is screwed, is formed so as to be thicker than the other portions, and the bulge portion 31c is made to bulge upward from the upper end of the fixing portion 31b, it is possible to enable the bolt 44, which has sufficient length, to be used, and the necessary tightening force can thus be obtained.

When the bulge portion 31c is made to bulge upward from the upper end of the fixing portion 31b, the position of the lower plate 36 of the battery module 34 becomes high in order for it to avoid interfering with the bulge portion 31c, and there is the problem that the vertical dimension of the battery pack 17 increases by a corresponding portion. However, in accordance with the present embodiment, since the lower plate 36 of the battery module 34 has the thick opposite side portions 36b and the thin middle portion 36c, which forms the recess portion recessed upward from the opposite side portions 36b, and the bulge portion 31c of the case main body 31 is fitted into the recess portion of the lower plate 36, it is possible to lower the position of the lower plate 36 and avoid any increase in the vertical dimension of the battery pack 17. In this arrangement, since the height H2 of the upper end of the heat transfer member 46 is larger than the height H1 of the upper end of the bulge portion 31c, the upper end of the bulge portion 31c is prevented from interfering with the lower plate 36.

Furthermore, since the lower plate 36 of the battery module 34 is formed such that the plate thickness of the opposite side portions 36b is large and the plate thickness of the middle portion 36c is small, and the extended portion 39b of the side plate 39 of the battery module 34 is superimposed on the lower face of the opposite side portions 36b of the lower plate 36, it is possible to strongly support the extended portion 39b of the side plate 39 by the opposite side portions 36b of the lower plate 36, which have a large plate thickness, thereby enhancing the rigidity of the battery module 34.

Moreover, since the bulge portion 31c of the case main body 31 is disposed at a position where it does not interfere with the extended portion 39b of the side plate 39 of the battery module 34, even if the bending angle of the extended portion 39b of the side plate 39 opens out due to change over time, etc. (see chain line in FIG. 5), the extended portion 39b is prevented from interfering with the bulge portion 31c.

Furthermore, since the case main body 31 of the battery case 18 is made from by metal die-casting, and the fixing portion 31b is formed integrally with the case main body 31, it is possible to easily form the fixing portion 31b with a desired shape without increasing the number of components. Moreover, since the bolt hole 31d is formed so as to extend upward from the lower face of the fixing portion 31b and the lid member 43 is fixed to the case main body 31 by the bolt 44 screwed into the bolt hole 31d, it is possible to simply and strongly fix the lid member 43 to the case main body 31.

An embodiment of the present invention is explained above, but the present invention may be modified in a variety of ways as long as the modifications do not depart from the gist of the present invention.

For example, the cooling medium jacket of the present invention is not limited to the water jacket 45 of the embodiment, and the cooling medium flowing therethrough is not limited to cooling water.

Furthermore, the battery case 18 of the embodiment is formed from the case main body 31 and the cover 32, but is not limited thereto.

Moreover, in the embodiment all of the plurality of fixing portions 31b of the case main body 31 are disposed so as to surround the outer side of the water jacket 45, but some of the fixing portions 31b may be disposed on the inner side of the water jacket 45.

What is claimed is:

1. A battery pack for an electric vehicle in which by fixing a lid member to a plurality of fixing portions provided on a bottom wall of a battery case housing a battery module having a plurality of battery cells, a cooling medium jacket for cooling the battery module is formed between a lower face of the bottom wall of the battery case and an upper face of the lid member, at least part of the plurality of fixing portions being disposed on an outer side of the cooling medium jacket,
wherein a thickness of the battery case in each of the fixing portions is formed so as to be larger than a thickness of the battery case around each of the fixing portions,
the fixing portion comprises a bulge portion that bulges upward toward a lower face of the battery module,
the lower face of the battery module comprises a recess portion that is recessed upward and a projecting portion that projects downward, and
the bulge portion is disposed at a position opposing the recess portion.

2. The battery pack for an electric vehicle according to claim 1, wherein
a heat transfer member is disposed outside of the cooling medium jacket at a position away from the bulge portion, the heat transfer member being sandwiched between an upper face of the bottom wall of the battery case and the lower face of the battery module, and
a height of an upper end of the heat transfer member is larger than a height of an upper end of the bulge portion.

3. The battery pack for an electric vehicle according to claim 1, wherein
the battery module comprises a plate-shaped member, made of a metal, that forms the lower face of the battery module,
the plate-shaped member has a thin portion in a portion opposing the cooling medium jacket, the thin portion having a smaller thickness than that of other portions, and
at least part of the bulge portion is positioned beneath the thin portion.

4. The battery pack for an electric vehicle according to claim 3, wherein
the battery module comprises a pair of side plates that fasten the plurality of battery cells together as a unit, the side plates each having a main body portion that covers side faces of the plurality of battery cells and an extended portion that is formed by bending a lower end of the main body portion and is superimposed on the lower face of the plate-shaped member, and
the bulge portion is disposed at a position without interference with the extended portion.

5. The battery pack for an electric vehicle according to claim 4, wherein
the plate-shaped member is formed such that a plate thickness of opposite side portions along the pair of side plates is large and a plate thickness of a middle portion sandwiched between the pair of opposite side portions is small, and
the extended portion of the side plate is superimposed on at least part of the opposite side portions of the plate-shaped member.

6. The battery pack for an electric vehicle according to claim 1, wherein
a bolt hole is formed so as to extend upward from a lower face of the fixing portion, and
the lid member is fixed to the battery case by a bolt screwed into the bolt hole.

7. The battery pack for an electric vehicle according to claim 1, wherein
the battery case is made by metal die-casting, and
the fixing portion is formed integrally with the battery case.

* * * * *